United States Patent Office 3,639,508
Patented Feb. 1, 1972

3,639,508
THERMOPLASTIC BLENDS OF POLYARYLENE OXIDE AND BLOCK POLYMER, AND METHOD FOR MAKING THEM
Roger P. Kambour, Schenectady, N.Y., assignor to General Electric Company
Filed Jan. 3, 1969, Ser. No. 788,769
Int. Cl. C08f 29/12; C08g 43/02
U.S. Cl. 260—876 B
29 Claims

ABSTRACT OF THE DISCLOSURE

Liquid phase blending of a polyarylene oxide and a monovinyl aromatic block polymer provides for the production of a variety of thermoplastic materials having improved heat distortion.

Figure 1:
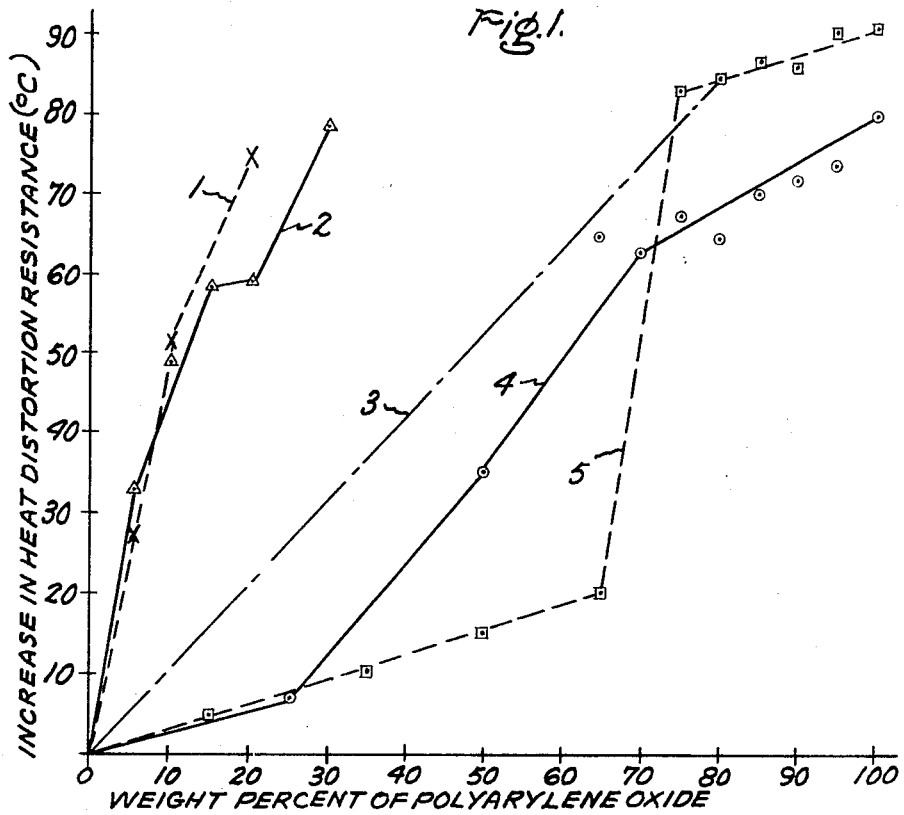

The present invention relates to substantially transparent thermoplastic compositions having improved resistance to distortion at elevated temperatures and a method for making them. More particularly, the present invention relates to the liquid phase blending of a polyarylene oxide and a monovinyl aromatic block polymer to provide for the production of a variety of substantially transparent plastic materials and elastomers having improved heat distortion resistance.

The thermoplastic compositions of the present invention comprise (A) a polyarylene oxide and (B) a monovinyl aromatic block polymer having a molecular weight up to 500,000 and at least one monovinyl aromatic block with an average molecular weight of from 2,000 to 200,000 constituting from 10% to 90% by weight of the monovinyl aromatic block polymer. The term "block polymer," or block copolymer, as utilized in defining the thermoplastic compositions of the invention, is more particularly defined as a polymer consisting essentially of linear blocks of at least two polymer species which are substantially uniform in composition, as distinguished from a random copolymer, or graft copolymer which is a branched polymer having a backbone with one or more side chains of another polymeric species. An example of a block polymer utilized in the invention is shown by the following:

~AAAAAABBBBB . . . BBBBAAA

An example of a graft polymer is shown as follows:

~AAAAAA~AAAAA~
B       B
B       B
B       B
B       B
⟨       B
        ⟨

A typical random copolymer can be represented as follows:

~AABABBABAABABABBBA~

An example of a particular preferred class of block polymers utilized in the practice of the invention, is taught by British Pat. 1,000,000. These block polymers are of the ABA type, where A is a polystyrene block and B is an organic rubbery block, such as polybutadiene block. These block polymers can be made by polymerizing monovinyl aromatic monomers, such as styrene, and diene monomer, such as butadiene, with organometallic initiators such as alkyl lithium compounds.

The present invention is based on the discovery that if a polyarylene oxide is liquid phase blended, for example, solution blended with a monovinyl aromatic block polymer such as a polystyrene block polymer, that a variety of valuable thermoplastic materials having unexpectedly improved properties are produced. For example, thermoplastic elastomeric compositions can be made, in accordance with the practice of the invention, having markedly improved resistance to structural deformation at elevated temperatures, referred to sometimes as "Heat Distortion Resistance." Commercially available thermoplastic elastomeric block polymers of polystyrene and polybutadiene, for example, as taught by Holden et al., Pat. 3,265,765, have been found to soften at temperatures as low as 59° C. As a result, these thermoplastic elastomers cannot be employed at temperatures significantly higher than room temperature due to undesirable changes in physical properties, or shape, due to loss of strength and plastic flow.

Prior to the present invention, polyarylene oxide, a high performance thermoplastic, described more particularly in Hay Pats. 3,306,874 and 3,306,875, both assigned to the same assignee as the present invention, was employed in various commercially available thermoplastic polystyrene resin compositions to impart improved properties thereto. FIG. 1, for example, shows a comparison of curves 1–5, which are heat distortion curves of various polystyrenepolyarylene oxide compositions. Values are obtained by plotting "Increase in Heat Distortion Resistance (° C.)" against "Percent by Weight of Polyarylene Oxide" used in the polystyrene-polyarylene oxide compositions.

The heat distortion resistance for polystyrene-polybutadiene-polystyrene block polymers, curves 1 and 2, where heat distortion starts to occur at about 59° C. (which is shown as 0° C. on the graph) is compared to certain polystyrene graft copolymers, curves 3 and 4, where heat distortion occurs at 80° C. and 105° C. respectively (also shown as 0° C.) and curve 5, which is a random styrene-acrylonitrile copolymer which starts to show signs of heat distortion at 105° C. (also shown as 0° C.). As shown by FIG. 1, these curves have markedly different slopes.

Curves 1 and 2, for example, show the results obtained when up to about 30% by weight of polyarylene oxide is employed with polystyrene-butadiene-polystyrene elastomeric block polymers. A surprising improvement in heat distortion resistance is achieved without substantial loss in elastomeric properties, since only a relatively small amount of the polyarylene oxide is required to impart a significant increase in heat distortion resistance to these elastomeric materials. This is contrasted to heat distortion results achieved with other previously described commercially available thermoplastic polystyrene-polybutadiene graft copolymer and terpolymer compositions as shown by curves 3, 4 and 5. Curve 3, for example, shows the heat distortion improvement wtih respect to retention of strength, stiffness or shape, imparted to high impact polystyrene, a commercially avaliable polystyrene graft copolymer of about 90% by weight of polystyrene and 10% by weight of polybutadiene made by free radical polymerization of the polystyrene in the presence of the polybutadiene. Curve 4 shows the heat distortion improvement obtained with a graft polystyrene-acrylonitrile-butadiene terpolymer having about 41% by weight of polystyrene. Curve 5 shows heat distortion improvement achieved with polyarylene oxide in combination with a polystyrene-polyacrylonitrile random copolymer containing about 83% polystyrene. A comparison between Curves 1 and 4 showing polystyrene-polyarylene oxide blends having about the same weight percent polystyrene, but different types of polystyrene polymers dramatically demonstrates the significant difference achieved with the employment of polyarylene oxide. Curve 1, the polystyrene-polybutadiene-polystyrene block polymer blend having only 20% by weight of the polyarylene oxide with respect to heat distortion resistance, is comparable to curve 4, showing the polystyrene terpolymer polyarylene oxide blend having as high as 80% by weight of polyarylene oxide.

Figure 2:
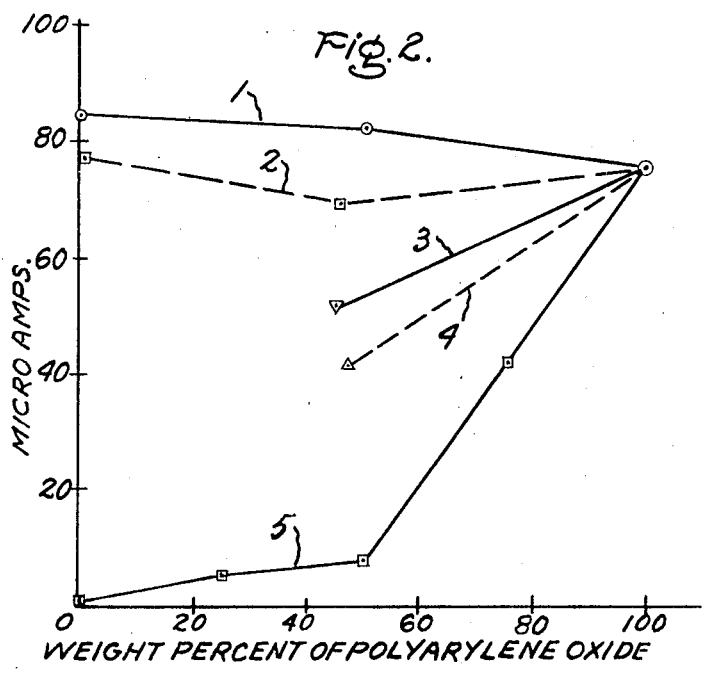

FIG. 2 shows light transmission curves of blends of several organic rubber-containing polystyrene compositions containing block polymers and graft copolymers with different amounts by weight of polyarylene oxide. For example, curve 1 shows a homopolymerized polystyrene blend, curves 2-4 show blends containing polystyrene-polybutadiene block polymer, and curve 5 shows a blend containing a polystyrene-polybutadiene graft copolymer. With the exception of curve 1, all of the polystyrene compositions contain chemically combined organic rubber in the form of polybutadiene. The degree of transparency of these rubber-containing polystyrene compositions is plotted by measuring light transmission through a film thickness of about 35 to 40 mils, as shown by a reading of photocurrent on a light meter in terms of microamps. A value of 100 microamps indicates the absence of film. Curve 1 shows an organic rubber-free blend of homopolymerized polystyrene and polyarylene oxide which maintains a substantially constant reading of about 85 over the entire composition range. Curve 2 shows a blend of polyarylene oxide with a styrene-butadiene-styrene block polymer having about 80% by weight of polystyrene which blend contains about 10% by weight of organic rubber, at the point of 45% by weight of polyarylene oxide. Curves 3 and 4 are ternary blends of polyarylene oxide, homopolymerized polystyrene, and polystyrene-polybutadiene-polystyrene block polymers having 43% by weight of polystyrene. At the point of 45% by weight of polyarylene oxide, the composition shown by curve 3 has about 10% by weight of chemically combined polybutadiene. At the point of 47.5% by weight of polyarylene oxide the composition of curve 4 has about 5% by weight of chemically combined polybutadiene. Curve 5 is a blend of polyarylene oxide and high impact polystyrene-polybutadiene graft copolymer of about 90% by weight polystyrene. The blend at 50% by weight of polyarylene oxide contains about 5% by weight of chemically combined polybutadiene. A comparison between curve 2 and curve 5 of FIG. 2, at 45% by weight polyarylene oxide, shows that a styrene block polymer containing about 10% by weight of chemically combined polybutadiene is significantly more transparent than a styrene graft copolymer having as little as 5% by weight of chemically combined polybutadiene. Also surprising is the showing in curves 3 and 4 illustrating that significant amounts of homopolymerized styrene can be incorporated with styrene-butadiene-styrene block polymers without seriously affecting the transparency of films made from these blends.

Although the reason why the unexpected results of the present invention are achieved is not completely understood, one possible explanation is that during the liquid phase blending of the polyarylene oxide and the monovinyl aromatic block copolymer, in accordance with the practice of the present invention, the polyarylene oxide preferentially forms a single glassy phase with the monovinyl aromatic block of the block polymer. It has been found, for example, that the polyarylene oxide even has a greater affinity for the monovinyl aromatic block of the block polymer than does the homopolymerized styrene. This is evidenced by the superior degree of transparency of the binary blend shown by curve 2, compared to the ternary blend shown by curve 3. Both of these blends at 45% by weight of polyarylene oxide contain about the same total weights of polystyrene and polybutadiene. The ternary blend contains homopolymerized polystyrene and a polystyrene-polybutadiene block polymer having about 43% by weight polystyrene, while the binary blend contains a polystyrene-polybutadiene block polymer having about 80% by weight of polystyrene.

As described hereinafter in more detail, among the various types of thermoplastic materials included in the scope of the thermoplastic compositions of the present invention, are thermoplastic elastomers having significantly improved heat distortion resistance, transparent organic rubber-containing polyarylene oxide compositions having substantially improved toughness, and a variety of transparent monovinyl aromatic thermoplastic compositions having improved toughness and resistance to the effects of heat, ultraviolet light, etc.

There is also provided by the present invention, a liquid phase blending method which comprises (1) agitating at a temperature up to 310° C. a mixture comprising a polyarylene oxide, a monovinyl aromatic block polymer, and up to 99% by weight of the mixture of an organic solvent, where the temperature employed is at least 30° C. above the glass transition temperature of the polyarylene oxide (2) recovering a liquid phase blend of the mixture comprising the polyarylene oxide and the monovinyl aromatic block polymer substantially free of organic solvent.

The term "glass transition temperature," as utilized in the description of the present invention, with respect to defining the liquid phase blending characteristics of the polyarylene oxide is the temperature beyond which the polyarylene oxide can form a solution with the monovinyl aromatic block of the block polymer. In the absence of any organic solvent, the glass temperature of 2,6-dimethyl polyphenylene oxide, for example, is about 210° C. The glass transition temperature of mixtures of organic solvents and polyarylene oxide can be determined by means of a Perkins-Elmer DSC Scanning Colorimeter by well known techniques of the art as shown by G. A. Bernier and R. P. Kambour, Macromolecules, vol. 1, page 393, 1968. For example, a mixture of 20% by weight solvent and 80% polyphenylene oxide can have a glass transition temperature below 50° C., when methylene chloride is used, to as high as 100° C. when the organic solvent is a chlorinated biphenyl. By means of the above-described test, an appropriate temperature can be determined with a particular concentration of a particular solvent, to ensure that a sufficient degree of liquid phase blending will be achieved.

Another indication that a satisfactory degree of liquid phase blending has been achieved in accordance with the practice of the invention, is when enough organic solvent is employed to dissolve the various components of the mixture so that a substantially homogenous solution blend is achieved. In instances, however, where a reduced amount of organic solvent is employed, which is insufficient to complete effect the dissolution of the components, the temperature of the mixture can be raised to melt the ingredients etc. For instance where an insufficient amount of organic solvent has been employed to effect complete dissolution, an indirect indication that a sufficient degree of liquid phase blending has been achieved is by measuring the dynamic mechanical properties of the liquid phase blend by means of a Torsional Pendulum technique as indicated by ASTM Test Number D2236–64T. A further technique which can be employed is the Vibrating Coated Reed Mechanical Loss Test as described in Polymer Preprints, vol. 8, No. 2, p. 1532 (1967) by J. F. Beecher, L. Marker, R. D. Bradford and S. L. Aggarwal. Those skilled in the art would know that if a sufficient degree of liquid phase blending has been achieved in accordance with the practice of the invention, a test sample will likely be free of the dynamic mechanical properties associated with the glass transition temperature of the pure polyarylene oxide component employed in the blend. If desired, the sample also can be molded to a sheet to determine if it is substantially transparent. In instances where an extruder is utilized, such as under melt blending conditions, the extruder melt also will be transparent as it exits from the extruder.

The polyarylene oxide which can be employed in the present invention to provide for the production of the thermoplastic compositions having improved heat distortion are more particularly described and claimed in U.S. Pats. 3,306,874 and 3,306,875, both assigned to the same assignee as the present invention.

The preferred polymers may be represented by the following formula, (1) 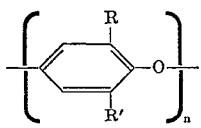

wherein R is a monovalent substituent selected from the group consisting of hydrogen, hydrocarbon radicals free of a tertiary α-carbon atom, halohydrocarbon radicals having at least two carbon atoms between the halogen atom and phenol nucleus and being free of a tertiary α-carbon atom, hydrocarbonoxy radicals free of aliphatic, tertiary α-carbon atoms, and halohydrocarbonoxy radicals having at least two carbon atoms between the halogen atom and phenol nucleus and being free of an aliphatic, tertiary α-carbon atom; R' is the same as R and may additionally be a halogen; $n$ is an integer equal to at least 50, e.g. from 50 to 800 and preferably 150 to 300. Included among these preferred polymers are polymers having a molecular weight in the range of between 6,000 and 100,000.

Typical examples of the monovalent hydrocarbon radicals that R and R' may be in the above formula are: alkyl, including cycloalkyl, e.g., methyl, ethyl, propyl, isopropyl, butyl, secondary butyl, tertiary butyl, isobutyl, cyclobutyl, amyl, cyclopentyl, hexyl, cyclohexyl, methylcyclohexyl, ethylcyclohexyl, octyl, decyl, octadecyl, etc.; alkenyl, including cycloalkenyl, e.g., vinyl allyl, butenyl, cyclobutenyl, isopentenyl, cyclopentenyl, linolyl, etc.; alkynyl, e.g., propargyl, etc., aryl, including alkaryl, e.g. phenyl, tolyl, ethylphenyl, xylyl, naphthyl, methylnaphthyl, etc.; aralkyl, e.g., benzyl, phenylethyl, phenylpropyl, tolylethyl, etc. The monovalent halohydrocarbon radicals may be the same as the hydrocarbon radicals, as outlined above, except methyl and α-haloalkyl radicals, wherein one or more of the hydrogen atoms are replaced by halogen, to produce halohydrocarbon radicals having at least two carbon atoms between the halogen and the free valence, examples of which are: 2-chloroethyl, 2-bromoethyl, 2-fluoroethyl, 2,2-dichloroethyl, 2- and 3-bromopropyl, 2,2-difluoro-3-iodopropyl, 2-, 3-, and 4-bromobutyl, 2-, 3-, 4-, and 5-fluoroamyl, 2-chlorovinyl, 2- and 3-fluoropropargyl, mono-, di-, tri-, tetra-, and pentachlorophenyl, mono- ,di-, tri-, and tetra-bromotolyl, chloroethylphenyl, ethylchlorophenyl, fluorophenylchloroethyl, bromotolylethyl, etc.

Typical examples of the monovalent hydrocarbonoxy radicals are: methoxy, ethoxy, propoxy, isopropoxy, butoxy, secondary butoxy, tertiary butoxy, amyloxy, hexyloxy, octyloxy, decyloxy, vinyloxy, allyloxy, butenyloxy, propargyloxy, phenyloxy, toloxy, ethylphenoxy, naphthoxy, methylnaphthoxy, benzyloxy, phenylethoxy, phenylpropoxy, tolylethoxy, etc. The monovalent halohydrocarbonoxy radicals may be the same as the above oxyhydrocarbonoxy, except methoxy and α-haloalkoxy radicals, where one or more of the hydrogens are replaced by a halogen, i.e., fluorine, chlorine, bromine or iodine, to produce halohydrocarbonoxy radicals having at least two carbon atoms between the halogen and the free valence, a few typical examples of which are: 2-chloroethoxy, 2-bromoethoxy, 2-fluoroethoxy, 2,2-dichloroethoxy, 2- and 3-bromopropoxy, 2,2-difluoro-3-chloropropoxy, 2-, 3-, and 4-iodobutoxy-2-, 3-, 4-, and 5-fluoroamyloxy, 2-chlorovinyloxy, 2- and 3-bromoallyloxy, 2- and 3-fluoropropargyloxy, mono-, di-, tri-, and tetrabromotoloxy, chloroethylphenoxy, ethylchlorophenoxy, iodoxyloxy, chloronaphthoxy, bromobenzyloxy, chlorophenylethoxy, phenylchloroethoxy, bromotolylethoxy, etc.

Typical examples of polyphenylene oxides which may be employed in the compositions and process of this invention are:

poly-(2,6-dimethyl-1,4-phenylene)-oxide,
poly-(2,6-diethyl-1,4-phenylene)-oxide,
poly-(2,6-dibutyl-1,4-phenylene)-oxide,
poly-(2,6-dilauryl-1,4-phenylene)-oxide,
poly-(2,6-dipropyl-1,4-phenylene)-oxide,
poly-(2,6-dimethoxy-1,4-phenylene)-oxide,
poly-(2,6-diethoxy-1,4-phenylene)-oxide,
poly-(2-methoxy-6-diethoxy-1,4-phenylene)-oxide,
poly-(2-methoxy-6-ethoxy-1,4-phenylene)-oxide,
poly-[2,6-di-(chlorophenoxy)-1,4-phenylene]-oxide,
poly-[2,6-di-(chloroethyl)-1,4-phenylene]-oxide,
poly-(2-methyl-6-isobutyl-1,4-phenylene)-oxide,
poly-(2,6-ditolyl-1,4-phenylene)-oxide,
poly-[2,6-di-(chloropropyl)-1,4-phenylene]-oxide,
poly-(2,6-diphenyl-1,4-phenylene)-oxide, etc.

Included by the monovinyl aromatic block polymers of the present invention, referred to hereinafter as the "block polymers," are block polymers having at least one block consisting essentially of chemically combined monovinyl aromatic hydrocarbon units, derived from monovinyl aromatic hydrocarbons as shown in Formula 2 below, which block is chemically combined with at least one other dissimilar homopolymeric or copolymeric block. The term copolymeric block utilized in defining the block polymers of the invention includes either a random copolymeric block or a tapered block. The monovinyl aromatic hydrocarbons which can be employed to make the block polymers of the invention are monomers derived from the benzene series such as shown by the following formula, (2) 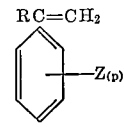

such as styrene, vinyltoluene, vinylxylene, ethylvinylbenzene, isopropylstyrene, etc., where R is hydrogen, lower alkyl, halogen, Z is a member selected from the class consisting of hydrogen, vinyl, chlorine and lower alkyls such as methyl, etc., and (p) is a whole number equal to 0 to 5. In addition to the monovinyl aromatic block, which will be referred to hereinafter as the "polystyrene block," which can have a molecular weight between 5,000 to 200,000 and preferably 10,000 to 100,000, the block polymer of the present invention can consist of at least one other dissimilar organic block which can be either elastomeric, or nonelastomeric, i.e. glassy or crystalline, in a sequence such as AB, ABA, BAB, etc., where A is the polystyrene block, B is a dissimilar organic block, referred to hereinafter as either the "rubbery organic block," or the "glassy organic block," etc. The term "rubbery" or "elastomeric" block as used in the description of the invention signifies blocks having a glass transition temperature below 25° C., and preferably, below ° C. The term "glassy" or "crystalline" block is a block having a glass or melting temperature above 25° C., and preferably, above 40° C. The block polymer of the present invention also can include repeating AB, ABA, BAB sequences, as well as multiple block polymers produced by condensation of an alkaline terminal block polymer with an aliphatic dihalodialkyl compound, such as dichloroethane, dibromoethane, etc., as well as $COCl_2$, $COBr_2$, $SOCl_2$, $SOBr_2$, and the like compounds.

Some examples of block polymers having polystyrene blocks and glassy or crystalline organic blocks are, for example, polystyrene-polyethylene oxide block polymers, polystyrene-polymethylmethacrylate block polymers, polystyrene - polytetrahydrofuran block polymers, polystyrene-polymethylene oxide block polymers, polystyrene-polyacrylonitrile block polymers, polystyrene-polydiphenylsiloxane block polymers, polystyrene-polycarbonate etc. Included among the block polymers of polystyrene having rubbery block are polystyrene-polybutadiene block polymers, polystyrene-polyisoprene block polymers, polystyrene-polyethylenepropylene block polymers, polystyrene-polyethylacrylate block polymers, polystyrene-poly(dimethylsiloxane) block polymers, polystyrene-polypropylene oxide block polymers, etc. Some of the polystyrene-poly(dimethylsiloxane) block polymers which can be employed are shown by French Pat. 1,526,205.

Homopolymerized monovinyl aromatic hydrocarbons of the benzene series, such as shown by Formula 2, for example, homopolymerized polystyrene, can be employed with the polyarylene oxide and block polymer in accordance with the present invention in amounts by weight equal to the amount of polyarylene oxide. The monovinyl aromatic hydrocarbon homopolymers, hereinafter referred to as "polystyrene homopolymers" can have a molecular weight between from 25,000 to 500,000, preferably 75,000 to 350,000.

In the practice of the method of the present invention, the polyarylene oxide and the polystyrene block polymer are liquid phase blended to provide for the production of an elastomeric blend or a plastic blend in accordance with such factors as the amount of polyarylene oxide employed, the type of styrene block polymer utilized and the amount of polystyrene homopolymer utilized.

The term "liquid phase blending" as employed in the description of the method of the present invention, can signify either "solution blending" or "melt blending." In instances where solution blending is employed, recovery of the blend from the solution of the various polymeric components can be achieved by coprecipitation with an appropriate solvent in accordance with the standard techniques. Depending upon the nature of the styrene block polymer, various solvents can be employed. A suitable solvent for effecting the dissolution of the various polymeric components is any solvent which is inert to the polymeric components and which can be utilized at temperatures below the decomposition point of such polymeric components. The solution concentration of at least 1% of polymeric components based on the total weight of the solution at temperature at the range of between −50° C. to 100° C. has been found to be effective. It is, of course, understood that this dissolution of the polymeric components can be accelerated by agitation, such as stirring or shearing to produce a substantially uniform one phase mixture. Suitable solvents include, for example, chloroform, methylene chloride, ethylene chloride, carbon tetrachloride, toluene, benzene, chlorobenzene, etc. In order to effect coprecipitation of the blend from the solution, there can be employed an organic solvent inert to the components in which the components are insoluble, such as methanol, ethanol, propanol, n-pentane, n-hexane, etc., in accordance with standard techniques. Recovery of the blend thereafter can be readily achieved by standard procedures such as filtration, decantation, etc.

Melt blending of the various polymeric components will also provide for the production of the thermoplastic compositions of the present invention. Melt blending has been found to be particularly effective at about 100° C. above the glass transition range of the polyarylene oxide, and more particularly over a range of 275° C. to 310° C. in the absence of organic solvent. Limited amounts of a suitable organic solvent in combination with the various polymeric components, such as polyarylene oxide, the polystyrene block polymer and optionally with the polystyrene homopolymer also can be employed to liquid phase blend where the organic solvent serves as a plasticizer and a means for lowering the glass transition temperature of the polyarylene oxide. Experience has shown, for example, that when melt blending a polyarylene oxide in combination with a polystyrene block polymer having an organic rubbery block, such as a polybutadiene block, limited amounts of organic solvent must be employed because excessive degradation of the polybutadiene block can occur at temperatures above 150° C. An antioxidant can be employed in combination with oxygen free atmosphere to reduce oxidation. Suitable antioxidants which can be used are, for example, phenyl-beta-naphthylamine and a 1:1 mixture of acetylphenylhydrazine and tricetylborate, etc.

In order to avoid the necessity of employing an oxygen free atmosphere, or excessive amounts of antioxidants, the use of an organic solvent, as previously described can be employed to lower the glass transition temperature of the polyarylene oxide sufficiently so that the melt blending can be practiced at temperatures as low as 0° C., preferably, between 25° C. and 100° C. In order to achieve a satisfactory degree of liquid phase blending in accordance with the melt blending technique, that is to achieve blending on a molecular scale, a high degree of shearing, such as provided by a vented extruder, can be employed. At the termination of the liquid phase blending of the various polymeric components, either by the use of a solution blending technique or a melt blending technique, including the "plasticizer" technique with limited amounts of solvent, the liquid phase blend can be recovered by standard procedures, such as by filtration, freeze drying, evaporation, etc., where an organic solvent or solvents are employed. This liquid phase blend can thereafter be molded to an appropriate shape by the application of heat and pressure in accordance with standard molding techniques.

Among the liquid phase blended thermoplastic compositions comprising the polystyrene block polymer and the polyarylene oxide provided by the present invention, are the elastomeric compositions which can have up to 40% by weight of the total compositions of the polyarylene oxide. Included by the polystyrene block polymers which can be employed to make the elastomeric compositions of the present invention are block polymers of monovinyl aromatic hydrocarbons and conjugated dienes, as taught in U.S. Pat. 3,265,765 Holden et al. These polystyrene block polymers are of the ABA type where the organic block joined to the polystyrene block can be homopolymerized butadiene or isoprene. Preferably, the polystyrene block polymer has from about 10% to about 45% by weight of polystyrene, based on the total weight of the block polymer. The polystyrene blocks can have a molecular weight of from 5,000 to 200,000, and preferably from 10,000 to 100,000. The polystyrene block copolymers can have a molecular weight of from 25,000 to 500,000, and preferably from 50,000 to 200,000. The polybutadiene blocks as distinguished from the total block polymer can have a molecular weight of from 20,000 to 200,000 and preferably 40,000 to 100,000. The preferred monovinyl aromatic compound which can be employed to make the elastomeric polystyrene block polymers, by such methods as anionic polymerization is styrene. However, other vinyl aromatic compounds can be employed, such as alpha-methylstyrene, para-methylstyrene, etc. The organic rubbery block preferably is made from butadiene, or isoprene, while other polymerizable organic monomers, such as ethylene, propylene and mixtures thereof also can be utilized.

Typical of the polystyrene block polymers which can be utilized in the practice of the invention to make the thermoplastic elastomeric compositions of the invention are Phillips 114 AL, Shell's Thermoplastic Rubbers 125, 226, 200, 201, 202 and 203. Some of these materials when extruded have typical values such as 300% modulus at from 150 to 1100 p.s.i., tensile strengths of from 650 to 3,000 p.s.i. and ultimate elongations of from 500 to 1100%. Blends of these various elastomeric polystyrene-polybutadiene block copolymers having different weight percents polystyrene also can be employed in the practice of the present invention in combination with the polyarylene oxide to make the elastomeric compositions of the present invention.

In addition to the above-described elastomeric compositions which can be made in accordance with the practice of the present invention by liquid phase blending of the polystyrene block polymers containing organic rubbery blocks, there is also provided by the present invention plastic transparent polyarylene oxide compositions having improved toughness. These transparent plastic composi-aromatic block polymer and can have up to an equal weight thereof of the polyaryleneoxide of polymerized monovinyl aromatic compounds, such as homopolymerized polystyrene. These transparent toughened plastic compositions also can contain up to 25% by weight of the total plastic composition of the rubbery organic block derived from the polystyrene block polymer.

In addition to the aforementioned elastomeric compositions and toughened transparent polyarylene oxide, plastic compositions of the present invention comprising polyarylene oxide and the monovinyl aromatic block polymer having organic rubbery blocks, there are also included in the thermoplastic compositions of the present invention liquid phase blends of polyarylene oxide and monovinyl aromatic blocks, such as polystyrene blocks and organic plastic blocks. For example, a liquid phase blend of a polyphenylene oxide and a polystyrene-polymethacrylate block polymer in proportions of from 1% to 99% by weight of the polyphenylene oxide, and from 99% by weight to 1% of the polystyrene-polymethacrylate block polymer is included in the substantially transparent thermoplastic compositions of the invention. These thermoplastic materials have substantially improved resistance to deformation when subjected to elevated temperatures, as compared to standard polystyrene-polymethacrylate block polymers free of liquid phase blended polyphenylene oxide. Compositions of these liquid blend polyarylene oxide and monovinyl aromatic block polymers can have organic plastic blocks, such as polymethylmethacrylate, polydiphenylsiloxane, polyester, polyethylmethacrylate, etc.

The thermoplastic compositions of the present invention, including the elastomeric compositions and the transparent plastic compositions as described above, also can have various fillers incorporated into them such as calcium carbonate, silica gel, carbon black, etc., in amounts based on total composition weight of from 1% to 100% by weight and extender oils such as mineral oil in amounts from 1% to 30%, by weight. Additional ingredients such as antioxidants, for example, phenyl-β-naphthylamine and a 1:1 mixture of acetylphenylhydrazine and tricetyl borate, etc. can also be employed. These materials are utilized in combination with the aforementioned thermoplastic compositions of the present invention to modify their properties in accordance with standard techniques of the art.

In order to allow those skilled in the art to better understand how this invention may be mastered, the following examples are given by way of illustration and not be way of limitation. All parts are by weight.

EXAMPLE 1

Solution blends of various mixtures of polystyrene-polybutadiene-polystyrene block polymer and a poly-(2,6-dimethyl-1,4-phenylene)-oxide have a molecular weight of about 20,000 were made by separately dissolving the respective components in chloroform, mixing the two solutions and thereafter coprecipitating the components together in a Waring Blendor utilizing methanol. Prior to coprecipitation, there was added 1% by weight of an antioxidant based on total weight of solids in the form of a mixture containing equal amounts of acetylphenylhydrazine and tricetylborate. The polystyrene - polybutadiene-polystyrene block polymer had a molecular weight of approximately 100,000 and a weight percent of polystyrene of about 28% in the form of polystyrene blocks having a molecular weight of about 15,000. After combining the chloroform solution of the polystyrene - polybutadiene block polymer with the polyphenylene oxide, the resulting solution had about 10% solids. A series of five solutions was prepared containing 5%, 10%, 15%, 20% and 30% respectively of the polyphenylene oxide, based on the total weight of polymer solids. A solution also was prepared free of the polyphenylene oxide.

In each case while 200 parts of methanol were stirring in a Waring Blendor, there were added 100 parts by weight of the mixed polymer solution to coprecipitate the blend of the polystyrene-polybutadiene block polymer and the polyphenylene oxide. The resulting solution blend was recovered in crumb form by filtration. The various blends were then dried in a vacuum oven at around 70° C. for fifteen hours.

The blends were then compression molded into sheets having a thickness of 40 mils utilizing a molding temperature of around 175° C. for two minutes. It was found that all the molded sheets were substantially transparent.

After molding, sheets containing up to 10 parts of the polyphenylene oxide were pulled and flexed manually and were found to have substantially the same elastomeric properties as those free of the polyphenylene oxide. The slabs containing 20 and 30 parts of polyphenylene oxide exhibited valuable elastomeric properties with respect to flexibility indicating they could be employed in applications such as a gasket, or a flexible container for liquids.

Specimens were cut from the various sheets using an ASTM D1708 Dogbone specimen die to determine the heat distortion resistance of the various molded compositions.

The heat distortion resistance of the various slabs was evaluated by employing a linear tensile dead load test. The various dogbone speciments were hung under 100 p.s.i. dead load in an air oven at room temperature and their lengths under load measured. The oven was turned on and the heat distortion resistance was then measured by determining the temperature at which a slab exhibited a 10% increase in length while the temperature was rising at a rate of about 2½ degrees centigrade per minute. The elongation of the slab was determined by using a cathetometer focused through the oven window on the bottom of the specimen chuck to which a weight was attached equivalent to 100 p.s.i., based on the original specimen cross-sectional area.

Table I shows the results obtained where the blend composition is shown in terms of parts of polyphenylene oxide based on 100 parts of the blend, heat distortion temperature "HDT" (° C.) signifies temperature at which the slab experienced a 10% increase in length as previously defined, "T" is tensile strength (p.s.i.), "UE" is ultimate alongation (precent) and "E" is secant modulus at 300% elongation (p.s.i.).

TABLE I

| | HDT (° C.) | T (p.s.i) | UE (percent) | E (p.s.i.) |
|---|---|---|---|---|
| Blend composition: | | | | |
| 0 | 59 | 3,600 | 870 | 100 |
| 5 | 92 | 3,900 | 830 | 182 |
| 10 | 108 | 4,150 | 810 | 245 |
| 15 | 117 | 3,000 | 650 | 350 |
| 20 | 118 | 2,900 | 600 | 450 |
| 30 | 137 | 3,000 | 400 | 40 |

The above results show that the blend experienced a surprising improvement in heat distortion resistance with increasing weight percent of polyphenylene oxide, without substantial loss in elastomeric properties.

EXAMPLE 2

In accordance with Example 1, blends of poly-(2,6-dimethyl-1,4-phenylene)oxide and a polystyrene-polybutadiene-polystyrene block polymer of 43 weight percent of polystyrene and a molecular weight equal to about 100,000 were made. The blends contained 5 parts, 10 parts, and 20 parts, respectively, of the polyphenylene oxide, per 100 parts of the blend. Transparent sheets were obtained when the aforementioned blends were molded following the same procedure of Example 1. Table II shows the results obtained. The various terms in Table II are as defined as in Table I.

TABLE II

| Blend composition: | HDT (° C.) | T (p.s.i.) | UE (percent) | E (p.s.i.) |
|---|---|---|---|---|
| 0 | 61 | 2,200 | 700 | 260 |
| 5 | 88 | 2,750 | 540 | 490 |
| 10 | 113 | 3,200 | 440 | 715 |
| 20 | 135 | 2,500 | 200 | |

EXAMPLE 3

In accordance with the procedure of Example 1, two binary solution blends and a ternary solution blend were prepared containing poly-(2,6-dimethyl-1,4-phenylene)-oxide having a molecular weight of 20,000 and certain polystyrene-polybutadiene-polystyrene block polymers. The binary blends "A" and "B" contained polystyrene block polymers having 80% by weight of polystyrene and 28% by weight of polystyrene respectively. The ternary blend contained a polystyrene block polymer containing 43% by weight of polystyrene, along with homopolymerized polystyrene and the above described polyphenylene-oxide.

Binary A was prepared by solution blending 55 parts of the polystyrene block polymer and 45 parts of the polyphenylene oxide. The ternary blend was prepared by solution blending 8.3 parts of the polystyrene-polybutadiene-block polymer with 44.2 parts of the homopolymerized polystyrene having a molecular weight of about 235,000 and 47.5 parts of the polyphenylene oxide.

In addition to the above blends containing polystyrene-polybutadiene-polystyrene block polymers, a solution blend of a polystyrene-polybutadiene graft polymer identified as Cosden 825TV high impact polystyrene was also prepared following the same procedure. The solution blend of the polystyrene-polybutadiene graft polymer was made by solution blending the graft polymer with polyphenylene oxide utilizing chloroform and 50 parts of the polystyrene-polybutadiene graft polymer and 50 parts of the polyphenylene oxide. In addition, an additional blend was made "Binary C," which contained 90 parts of the same polystyrene glock polymer used in Binary B and 10 parts of the homopolymerized polystyrene used in the ternary blend.

The various blends were then molded into sheets each having a thickness of about 35–40 mils. Light transmission comparisons were made using a Zeiss GFL microscope with an attached Zeiss light meter. A collimated ¼ in diameter light beam from a tungsten lamp was passed up through the hole in the specimen stage to the microscope objective having a lens diameter of less than ¼ inch and thereafter through the occular to the photocell of the light meter. The light meter was calibrated to read 100 microamps when the light was on but without any sheet in the optical path, and 0 when the light was off. Test slabs were cut from each of the molded sheets of the respective blends and placed over the hole in the specimen stage to determine the light transmission. A reading also was obtained on similarly molded sheets of the poly-(2,6-dimethyl-1,4-phenylene)-oxide and of the homopolymerized polystyrene employed in making the blends.

The following results were obtained where "Binary A, B, and C" are the binary blends of the polystyrene-polybutadiene-polystyrene block polymer with either the polyphenylene oxide, (A and B) or homopolystyrene (C). Ternary indicates the blend of the polystyrene-polybutadiene-polystyrene block polymer, homopolymerized polystyrene, and polyphenylene oxide, "Graft" indicates the blend of the polystyrene-polybutadiene graft copolymer and the polyphenylene oxide, and "percent transparency" shows a reading in microamps obtained from the light meter utilized in the above-described test procedure.

Table III

| | Percent transparency |
|---|---|
| Polyphenylene oxide | 75 |
| Homopolystyrene | 85 |
| Binary A | 62 |
| Binary B | 75 |
| Binary C | 20 |
| Ternary | 42 |
| Graft | 8 |

It is significant to note that binary blend C containing homopolystyrene and the polystyrene block polymer having about 28% by weight polystyrene and a percent transparency of about 75, results in a blend having a percent transparency of about 20. However binary blend B containing the same weight ratio of ingredients except that the polyphenylene oxide is employed in place of the homopolystyrene has a percent transparency of 75.

EXAMPLE 4

A series of chloroform solution blends was made in accordance with the procedure of Example 1 with various polystyrene-polybutadiene-polystyrene block polymers having about 10% by weight of polystyrene, about 80% by weight polystyrene, and about 28% by weight of polystyrene. The polystyrene-polybutdiene-polystyrene block polymer containing about 10% by weight polystyrene more particularly had polystyrene blocks having a molecular weight of about 10,000 and butadiene blocks having a molecular weight of about 180,000. The polystyrene-polybutadiene-polystyrene block polymer having about 80% by weight polystyrene, had polystyrene blocks of about 22,000 and polybutadiene blocks of 9,500. In preparing the blends, there were utilized poly-(2,6-dimethyl-1,4-phenylene)-oxides having molecular weights respectively of about 13,000 and about 20,000.

Binary blends were prepared from the polystyrene-polybutadiene-polystyrene block polymers having 10% polystyrene and 80% polystyrene respectively. A tertiary blend also was prepared consisting of 45 parts of the polystyrene block polymer having 10% by weight of polystyrene, 45 parts of the polystyrene block polymer having 28% by weight of polystyrene, and 10 parts of the poly-(2,6-dimethyl-1,4-phenlene)-oxide having a molecular weight of 20,000.

After coprecipitation, test samples were cut from sheets obtained from the solution blends by molding the blends to a thickness of about 40 mils in accordance with the procedure of Example 1. All of the sheets that were obtained from the various blends were found to be substantially transparent giving a meter reading in accordance with the method of Example 3 of greater than 50 microamps.

Table IV below shows the results obtained where HDT, T, and UE are as previously defined in Table 1, and "Binary A" is the blend of 90 parts of the polystyrene-polybutadiene-polystyrene block polymer having 10% by weight of polystyrene and 10 parts of the poly-(2,6-dimethyl-1,4-phenylene)-oxide, "Binary B" is the blend of 55 parts of the polystyrene-polybutadiene-polystyrene block polymer having 80% by weight polystyrene and 45 parts of the polyphenylene oxide, and "Ternary" is the blend of 45 parts of the polystyrene block polymer having 10% by weight polystyrene, 45 parts of the polystyrene block polymer 28% by weight polystyrene and 10 parts of the polyphenylene oxide.

TABLE IV

| Blend | HDT (° C.) | T (p.s.i.) | UE (percent) |
|---|---|---|---|
| Binary A | 41 | 420 | 640 |
| Binary B | 135 | 8,965 | 30 |
| Ternary | 61 | 1,165 | 865 |

Those skilled in the art would recognize the surprising improvement in heat distortion resistance of the above compositions, in view of the heat distoration temperatures of the respective polystyrene-polybutadiene-polystyrene block polymers free from the polyphenylene oxide. The polystyrene block polymer in binary A has a heat distortion temperature of about 28° C., the polystyrene block polymers of the ternary blend, free of the polyphenylene oxide have a heat distortion temperature of 43° C. when blended in equal parts by weight, and the polystyrene block polymer in binary B having about 80% by weight polystyrene has a heat distortion temperature of about 73° C. when free of polyphenylene oxide.

EXAMPLE 5

A polystyrene-polymethylmethacrylate binary block polymer having a polystyrene content of about 50% and a molecular weight of about 150,000 is made by anionic block polymerization in accordance with the method taught by M. Baer, Journal of Polymer Science; Part A, vol. 2, p. 417–436 (1964).

A blend of 33 parts of poly-(2,6-dimethyl-1,4-phenylene)-oxide and 67 parts of the above-described polystyrene-polymethacrylate block polymer, one tenth part of acetyl phenyl hydrazine and one tenth part of tricetyl borate, each in the form of fine powder, are tumbled together in a mixing drum for three hours. The resulting mixture is then fed into a single screw variable pitch extruder with an extruder temperature maintained at about 550°–600° F. An extrudate is recovered through an orifice of about ⅛ inch in diameter at a rate of about 15 feet per minute. It is found to be transparent. It is chopped into pellets and compression molded into sheets of 230° C. The sheets are also transparent and exhibit improved heat distortion resistance as compared to samples of the polystyrene-polymethylmethacrylate block polymer of the same thickness free of the polyphenylene oxide. The blend also exhibits superior resistance to degradation resulting from exposure to ultraviolet light as compared to polyphenlene oxide sample of equal thickness free of the polystyrene-polymethylmethacrylate block polymer.

EXAMPLE 6

A series of solution blends in chloroform were made of poly-(2,6-dimethyl-1,4-phenylene)-oxide and a polystyrene-polyisoprene-polystyrene block polymer have a polystyrene content of about 13.5 percent based on the weight of the block polymer. The solution blends were prepared by mixing separate stock solutions of the polyphenylene oxide and the polystyrene block polymer each stock solution having about 10 percent polymer solids and one tenth of one percent of both acetyl phenyl hydrazine and tricetyl borate. Various mixtures of the stock solutions provided for blended chloroform solutions having 5 percent, 10 percent, 15 percent, and 25 percent of the poly-(2,6-dimethyl-1,4-phenylene)-oxide based on the total weight of polymer solids. Each of the blend solutions was then mixed with 10 volumes of methanol, per volume of the solution blend while the methanol was being stirred. The precipitated blend in each of the respective solutions was then recovered by filtration. The respective blends were then dried in vacuum at temperatures up to 50° C. for about 16 hours.

Sheets were compression molded from each of the blends at 160–165° C. for five minutes to a thickness of about 35–40 ml. All of the sheets obtained were transparent and equivalent to a light transmission value in accordance with the test procedure of Example 3 of about 75%. Test samples were cut from the sheets of the respective blends and were found to have substantially improved heat distortion resistance as well as exhibiting improved physical properties.

It should be recognized that the above examples are limited to only a few of the very many thermoplastic compositions which are included within the scope of the present invention as shown by the much broader variety of monovinyl aromatic block polymers included within the scope of Formula 2 and the polyarylene oxide included by Formula 1 as well as the description preceding these examples. In addition the present invention is directed to a much wider variety of liquid phase blending techniques which can be employed to make these compositions.

What I claim as new and desire to secure by Letters Patent of the United States is:

1. Thermoplastic compositions selected from the class consisting of elastomeric materials and substantially transparent materials comprising (A) a polyarylene oxide of the formula,

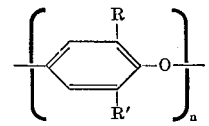

and (B) a monovinyl aromatic block polymer having a molecular weight up to about 500,000, and composed of at least one monovinyl aromatic block having an average molecular weight of from 2,000 to 200,000, which constitutes from 10% to 90%, by weight, of the monovinyl aromatic block polymer and a rubbery block having a glass transition temperature of below 25° C., wherein R is a monovalent substituent selected from the group consisting of hydrogen, hydrocarbon radicals free of a tertiary α-carbon atom, halohydrocarbon radicals having at least two carbon atoms between the halogen atom and phenol nucleus and being free of a tertiary α-carbon atom, hydrocarbonoxy radicals free of aliphatic, tertiary α-carbon atoms, and halohydrocarbonoxy radicals having at least two carbon atoms between the halogen atom and phenol nucleus and being free of an aliphatic tertiary α-carbon atom, R' is selected from the group of R radicals and halogen radicals, and $n$ is an integer equal to at least 50.

2. A substantially transparent thermoplastic composition in accordance with claim 1, having up to an equal weight of the polyarylene oxide of a homopolymerized monovinyl aromatic hydrocarbon.

3. A substantially transparent thermoplastic composition in accordance with claim 1, comprising from 1% to 99% by weight of the polyarylene oxide, and from 99% to 1% by weight of the monovinyl aromatic block polymer.

4. Elastomeric compositions in accordance with claim 1, comprising up to 40%, by weight, of the polyarylene oxide, based on the weight of the elastomeric composition.

5. A thermoplastic composition in accordance with claim 1, where the monovinyl aromatic block polymer has the formula,

ABA where A is a monovinyl aromatic block having a molecular weight of from 5,000 to 200,000, and B is an organic rubbery block having a molecular weight of from 20,000 to 200,000 and a glass transition temperature of below 25° C.

6. A substantially transparent thermoplastic composition in accordance with claim 1, comprising (A) a polyarylene oxide of the formula,

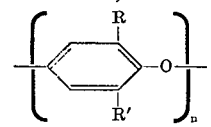

(B) up to an equal weight of (A) of a homopolymerized monovinyl aromatic hydrocarbon of the formula,

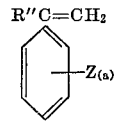

and (C) a monovinyl aromatic block polymer having the formula,

ABA wherein R is a monovalent substituent selected from the group consisting of hydrogen, hydrocarbon radicals free of a tertiary α-carbon atom, halohydrocarbon radicals having at least two carbon atoms between the halogen atom and phenol nucleus and being free of a tertiary α-carbon atom, hydrocarbonoxy radicals free of aliphatic, tertiary α-carbon atoms, and halohydrocarbonoxy radicals having at least two carbon atoms between the halogen atom and the phenol nucleus and being free of an aliphatic, tertiary α-carbon atom, R' is selected from the group of R radicals and halogen radicals, R" is a member selected from hydrogen, lower alkyl and halogen, Z is a member selected from hydrogen, vinyl, halogen and lower alkyl, $n$ is an integer equal to at least 50 and ($a$) is a whole number equal to 0 to 5, inclusive, A is a monovinyl aromatic block having a molecular weight of from 5000 to 200,000, and B is an organic rubbery block having a molecular weight of from 20,000 to 200,000.

7. A substantially transparent thermoplastic composition in accordance with claim 6, comprising polyarylene oxide and monovinyl aromatic block polymer, which is present in an amount sufficient to provide for up to 25% by weight of the thermoplastic composition of the organic rubbery block.

8. An elastomeric composition in accordance with claim 4, comprising a polyarylene oxide of the formula,

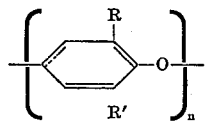

and a monovinyl aromatic block polymer of the formula,

ABA wherein R is a monovalent substituent selected from the group consisting of hydrogen, hydrocarbon radicals free of a tertiary α-carbon atom, halohydrocarbon radicals having at least two carbon atoms between the halogen atom and phenol nucleus and being free of a tertiary α-carbon atom, hydrocarbonoxy radicals free of aliphatic, tertiary α-carbon atoms, and halohydrocarbonoxy radicals having at least two carbon atoms between the halogen atom and phenol nucleus and being free of an aliphatic, tertiary α-carbon atom, R' is the same as R and may additionally be a halogen, $n$ is an integer equal to from 50 to 800, where A is a monovinyl aromatic block having a molecular weight of from 5,000 to 200,000 and B is an organic rubbery block of a polymerized conjugated diene having a molecular weight of from 20,000 to 200,000.

9. An elastomeric composition in accordance with claim 8, comprising a polystyrene-polybutadiene-polystyrene block polymer and up to 30% by weight of the elastomeric composition of poly(2,6-dimethyl-1,4-phenylene) oxide.

10. An elastomeric composition in accordance with claim 8, comprising a polystyrene-polyisoprene-polybutadiene block polymer and up to 30% by weight of the elastomeric composition of poly(2,6-dimethyl-1,4-phenylene) oxide.

11. A substantially transparent thermoplastic composition in accordance with claim 3, comprising a poly-(2,6-dimethyl-1,4-phenylene) oxide and a polystyrene-polybutadiene-polystyrene block polymer.

12. A substantially transparent thermoplastic composition in accordance with claim 7, comprising a poly-(2,6-dimethyl-1,4-phenylene) oxide and a polystyrene-polybutadiene-polystyrene block polymer.

13. A substantially transparent thermoplastic composition in accordance with claim 6, comprising a poly-(2,6-dimethyl-1,4-phenylene) oxide, homopolymerized polystyrene, and polystyrene-polybutadiene-polystyrene block polymer.

14. A liquid phase blending method which comprises (1) agitating at a temperature up to 310° C., a mixture comprising a polyarylene oxide, a monovinyl aromatic block polymer, and up to 99% by weight of the mixture of an organic solvent, where the temperature employed is at least 30° C. above the glass transition temperature of the polyarylene oxide and (2) recovering a liquid phase blend of the mixture comprising the polyarylene oxide and the monovinyl aromatic block polymer substantially free of organic solvent where the polyarylene oxide has the formula,

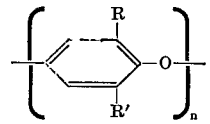

and the monovinyl aromatic block polymer has a molecular weight up to about 500,000, and composed of at least one monovinyl aromatic block having an average molecular weight of from 2,000 to 200,000, which constitutes from 10% to 90%, by weight, of the monovinyl aromatic block polymer and a rubbery block having a glass transition temperature of below 25° C., wherein R is a monovalent substituent selected from the group consisting of hydrogen, hydrocarbon radicals free of a tertiary α-carbon atom, halohydrocarbon radicals having at least two carbon atoms between the halogen atom and phenol nucleus and being free of a tertiary α-carbon atom, hydrocarbonoxy radicals free of aliphatic, tertiary α-carbon atoms, and halohydrocarbonoxy radicals having at least two carbon atoms between the halogen atom and phenol nucleus and being free of an aliphatic tertiary α-carbon atom, R' is selected from the group of R radicals and halogen radicals, and $n$ is an integer equal to at least 50.

15. A method in accordance with claim 14, which comprises (1) solution blending with an organic solvent, a mixture comprising a polyarylene oxide and a monovinyl aromatic block polymer to produce a substantially uniform mixture and (2) recovering a solution blend of the polyarylene oxide and the monovinyl aromatic block polymer from the resulting mixture of (1).

16. A method in accordance with claim 14, which comprises (1) dissolving a mixture comprising a polyarylene oxide and a monovinyl aromatic block polymer in an organic solvent and (2) effecting the removal of the organic solvent from the resulting mixture of (1).

17. A method in accordance with claim 14, which comprises (1) dissolving a mixture comprising a polyarylene oxide and a monovinyl aromatic block polymer in an organic solvent, (2) effecting the coprecipitation of the ingredients of the mixture comprising the polyarylene oxide and the monovinyl aromatic block polymer from the resulting solution by mixing the resulting solution with an organic liquid in which the ingredients of the mixture are substantially insoluble and (3) recovering a solution blend of the polyarylene oxide and the monovinyl aromatic block polymer from the resulting mixture of (2).

18. A method in accordance with claim 14, which comprises (1) agitating a solution blend comprising a polyarylene oxide and a monovinyl aromatic block polymer which solution is formed by blend mixing an organic solvent solution comprising the polyarylene oxide with an organic solvent solution comprising the monovinyl aromatic block polymer, and (2) effecting the removal of the organic solvent from the resulting solution blend.

19. A method in accordance with claim 18, which comprises effecting the coprecipitation of the polyarylene oxide and the monovinyl aromatic block polymer from the solution blend by mixing the solution blend with an organic solvent in which the ingredients of the solution blend are substantially insoluble and (2) recovering a blend of the polyarylene oxide and the monovinyl aromatic block polymer substantially free of the organic solvent.

20. A method in accordance with claim 14, which comprises (1) agitating a mixture comprising a polyarylene oxide and a monovinyl aromatic block polymer under shearing stresses and at a temperature at least 30° C. above the glass transition temperature of the polyacrylene oxide, and (2) recovering a melt blend of the mixture comprising the polyarylene oxide, and the monovinyl aromatic block polymer from the resulting mixture of (1).

21. A melt blend method in accordance with claim 20, which was performed at a temperature in the range of between about 25° C. to 310° C.

22. A melt blend method in accordance with claim 21, which comprises (1) agitating a mixture of a polyarylene oxide and a monovinyl aromatic block polymer in the presence of an amount of organic solvent which is sufficient to lower the glass transition temperature of the arylene oxide, at least 30° C. (2) removing the organic solvent from the resulting blend and (3) recovering a melt blend of the mixture comprising the polyarylene oxide and a monovinyl aromatic block polymer substantially free of the organic solvent.

23. A melt blend method in accordance with claim 20, employing a vented extruder.

24. A melt blend method in accordance with claim 21, which is performed in an oxygen free atmosphere.

25. A method in accordance with claim 14, where the polyarylene oxide is a polyphenylene oxide having a molecular weight in the range of between 6,000 to 100,000.

26. A method in accordance with claim 14, where the monovinyl aromatic block polymer is a polyestyrenebutadiene block polymer having a molecular weight between 10,000 to 100,000.

27. A method in accordance with claim 18, which comprises (1) agitating a chloroform solution comprising poly-(2,6-dimethyl-1,4-phenylene) oxide and a polystyrene-polybutadiene-polystyrene block polymer which chloroform solution is formed by mixing a chloroform solution of the polystyrene-polybustadiene-polystyrene polymer, (2) adding the solution to methanol to effect the coprecipitation of the poly-(2,6-dimethyl-1,4-phenylene) oxide and polystyrene-polybutadiene-polystyrene block polymer and (3) recovering a solution blend of the poly-(2,6-dimethyl-1,4-phenylene) oxide and polystyrene-polybutadiene-polystyrene block polymer.

28. A method in accordance with claim 18 which comprises agitating a chloroform solution of poly-(2,6-dimethyl-1,4-phenylene) oxide, homopolymerized polystyrene and a polystyrene-polybutadiene-polystyrene block polymer in which the weight of the homopolymerized polystyrene does not exceed the weight of the poly-(2-6-dimethyl-1,4-phenylene) oxide, (2) effecting the removal of the chloroform from the solution of (1), and (3) recovering a solution blend of poly-(2,6-dimethyl-1,4-phenylene) oxide, homopolymerized polystyrene, and polystyrene-polybutadiene-polystyrene block polymer which is substantially free of chloroform.

29. A method in accordance with claim 18 which comprises (1) combining a chloroform solution of a polystyrene-polyisoprene-polystyrene block polymer, and poly-(2,6-dimethyl-1,4-phenylene) oxide which is present in the solution at up to 30% by weight of the total weight of solids, (2) coprecipitating the polystyrene-polyisoprene-polystyrene block polymer and the poly-(2,6-dimethyl-1,4-phenylene) oxide from the solution of (1) by mixing it with methanol, and (3) recovering a blend of the polystyrene-polyisoprene-polystyrene block polymer and the poly-(2,6-dimethyl-1,4-phenylene) oxide substantially free of chloroform from the resulting mixture of (2).

References Cited
UNITED STATES PATENTS

| | | | |
|---|---|---|---|
| 3,231,635 | 1/1966 | Holden et al. | 260—876 |
| 3,265,765 | 8/1966 | Holden et al. | 260—876 |
| 3,356,761 | 12/1967 | Fox | 260—874 |
| 3,361,851 | 1/1968 | Gowan | 260—897 |
| 3,383,340 | 5/1968 | MacCallum et al. | 260—3 |
| 3,383,435 | 5/1968 | Cizek | 260—874 |
| 3,423,479 | 1/1969 | Hendricks | 260—824 |

SAMUEL H. BLECH, Primary Examiner

U.S. Cl. X.R.

260—33.6 R, A, UA, 33.8 R, 33.8 UA, 41 R, A, 41.5, 41.5 A, 45.9, 47 ET, 827, 873, 874, 876 R, 878, 880, 885, 886